(12) United States Patent
Nagata (10) Patent No.: US 8,704,925 B2
(45) Date of Patent: Apr. 22, 2014

(54) IMAGE SENSING APPARATUS INCLUDING A SINGLE-PLATE IMAGE SENSOR HAVING FIVE OR MORE BRANDS

(75) Inventor: Toru Nagata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/355,958

(22) Filed: Jan. 23, 2012

(65) Prior Publication Data

US 2012/0200755 A1 Aug. 9, 2012

(30) Foreign Application Priority Data

Feb. 9, 2011 (JP) .................... 2011-026527

(51) Int. Cl.
*H04N 3/14* (2006.01)
(52) U.S. Cl.
USPC ....................... 348/302; 348/222.1

(58) Field of Classification Search
USPC ............................................... 348/222.1, 302
See application file for complete search history.

(56) References Cited

FOREIGN PATENT DOCUMENTS

| JP | 2001-005046 A | 1/2001 |
| JP | 2004-157059 A | 6/2004 |

*Primary Examiner* — Usman Khan
(74) *Attorney, Agent, or Firm* — Fitzpatrick, Cella, Harper & Scinto (57) ABSTRACT

Solid-state image sensing elements p and q arranged on an image sensor at a higher density than other solid-state image sensing elements are configured so that the focus error amount due to the axial chromatic aberration of an imaging lens between the solid-state image sensing elements p and q is equal to or larger than an amount corresponding to the depth of focus in a maximum aperture. Also, the imaging lens has a f-number which allows the focus error amount to fall within the range between the two ends of the depth of focus.

3 Claims, 9 Drawing Sheets

| LG₁₁ | DG₁₂ | R₁₃ | DG₁₄ | LG₁₅ |
|------|------|-----|------|------|
| B₂₁ | O₂₂ | G₂₃ | O₂₄ | B₂₅ |
| R₃₁ | DG₃₂ | LG₃₃ | DG₃₄ | R₃₅ |
| G₄₁ | O₄₂ | B₄₃ | O₄₄ | G₄₅ |
| LG₅₁ | DG₅₂ | R₅₃ | DG₅₄ | LG₅₅ |

F I G. 10

| X₁₁ | O₁₂ | X₁₃ | O₁₄ | X₁₅ |
|------|------|------|------|------|
| O₂₁ | X₂₂ | O₂₃ | X₂₄ | O₂₅ |
| X₃₁ | O₃₂ | X₃₃ | O₃₄ | X₃₅ |
| O₄₁ | X₄₂ | O₄₃ | X₄₄ | O₄₅ |
| X₅₁ | O₅₂ | X₅₃ | O₅₄ | X₅₅ |

| $X_{11}$ | $X_{12}$ | $R_{13}$ | $X_{14}$ | $X_{15}$ |
| --- | --- | --- | --- | --- |
| $X_{21}$ | $X_{22}$ | $X_{23}$ | $X_{24}$ | $X_{25}$ |
| $P_{31}$ | $X_{32}$ | $X_{33}$ | $X_{34}$ | $R_{35}$ |
| $X_{41}$ | $X_{42}$ | $X_{43}$ | $X_{44}$ | $X_{45}$ |
| $X_{51}$ | $X_{52}$ | $R_{53}$ | $X_{54}$ | $X_{55}$ |

IMAGE SENSING APPARATUS INCLUDING A SINGLE-PLATE IMAGE SENSOR HAVING FIVE OR MORE BRANDS

BACKGROUND OF THE INVENTION

1. Field of the Invention

The present invention relates to an image sensing apparatus.

2. Description of the Related Art

A multiband camera having five or more color bands is more strongly influenced by the axial chromatic aberration of an imaging lens than a normal digital camera having three, R, G, and B color bands. In a multiband camera which forms color bands using a monochrome image sensor and switchable color filters, the influence of a focus error due to the axial chromatic aberration can be avoided by focus adjustment for each band (Japanese Patent Laid-Open Nos. 2001-005046 and 2004-157059).

"The focus adjustment for each band, which can be done using a filter-switchable multiband camera" described as a related art technique, cannot be performed in a multiband camera including a single-plate image sensor with all color bands.

Further, in a multiband camera including an image sensor having five or more color bands, the number ratio among pixels is not always equal in each individual band, so the resolution of this band varies depending on the number ratio. At this time, a band with a lower pixel density has a resolution that degrades in proportion to this density, so this band has substantially no resolution information. Under such circumstances, a problem resulting from a focus error due to axial chromatic aberration with respect to a high-resolution band must be solved.

SUMMARY OF THE INVENTION

The present invention has been made in consideration of the above-described problems, and provides a technique for reducing degradation in resolution due to axial chromatic aberration in an image sensing apparatus including a single-plate image sensor having five or more bands.

According to the first aspect of the present invention, an image sensing apparatus mounting an imaging lens and an image sensor formed by two-dimensionally arranging solid-state image sensing element 1 to solid-state image sensing element N in accordance with a Bayer arrangement when a solid-state image sensing element that senses light having an nth ($1 \leq n \leq N$; $N \geq 5$) color is defined as solid-state image sensing element n, wherein solid-state image sensing elements p and solid-state image sensing elements q arranged on the image sensor at a density higher than other solid-state image sensing elements among solid-state image sensing element 1 to solid-state image sensing element N are configured so that a focus error amount due to an axial chromatic aberration of the imaging lens of the image sensing apparatus between the solid-state image sensing elements p and the solid-state image sensing elements q is not more than an amount corresponding to a depth of focus in a maximum aperture, and the imaging lens has a f-number which allows the focus error amount to fall within a range between two ends of the depth of focus.

Further features of the present invention will become apparent from the following description of exemplary embodiments with reference to the attached drawings.

DESCRIPTION OF THE EMBODIMENTS

Embodiments of the present invention will be described below with reference to the accompanying drawings. Note that the embodiments to be described hereinafter exemplify cases in which the present invention is actually practiced, and provide practical examples of the configurations defined in claims.

First Embodiment

An image sensing apparatus according to this embodiment will be described first with reference to a block diagram shown in FIG. 1. Note that FIG. 1 illustrates an example of the configurations of functional units used in the following description, and does not show all configurations of the image sensing apparatus.

Figure 1:
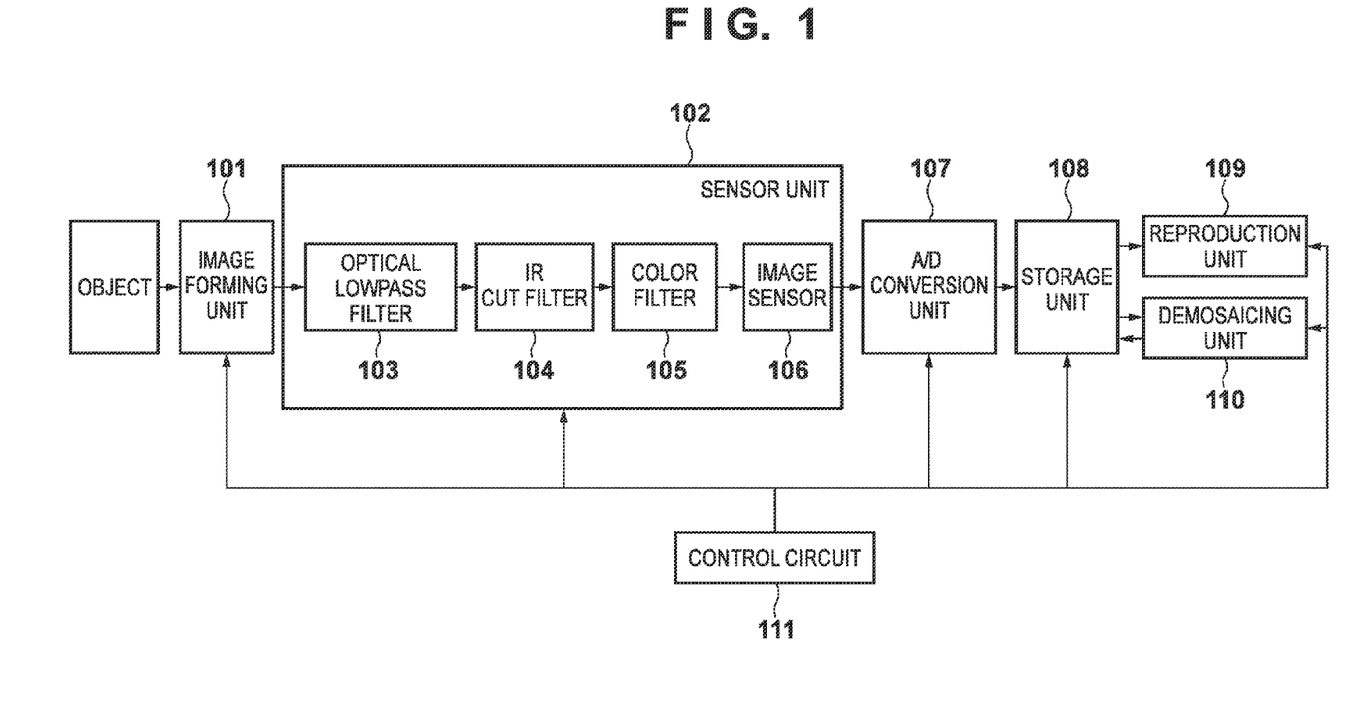
FIG. 1 is a block diagram illustrating an example of the configuration of an image sensing apparatus.

Also, although each unit shown in FIG. 1 may use hardware, some configurations such as a demosaicing unit 110 and a reproduction unit 109 may be implemented by software. In this case, this software is executed by a control unit such as a control circuit 111, and a corresponding function is implemented.

A light beam from the external world such as an object enters a sensor unit 102 via an image forming unit 101. The image forming unit 101 is formed by an imaging lens having aperture stop and focus functions. The light beam incident on the sensor unit 102 enters color filters 105 through an optical low pass filter 103 and an IR (infrared) cut filter 104.

The color filters 105 have several different spectral transmittance characteristics among individual pixels (individual solid-state image sensing elements) of an image sensor 106. The spectral transmittances of the color filters 105 will be described with reference to FIG. 2. The color filters 105 have spectral transmittances 201 (blue B), 202 (dark green DG), 203 (green G), 204 (light green LG), 205 (orange O), and 206 (red R) in ascending order of peak wavelength. That is, the color filters 105 have six color bands.

The image sensor 106 is formed by solid-state image sensing elements such as CMOSs or CCDs. Light transmitted through the color filters 105 enters the image sensor 106. Each solid-state image sensing element generates and outputs a signal (pixel signal) based on an amount of electric charges corresponding to the amount of incident light. At this time, the spectral sensitivity characteristic at each solid-state image sensing element is determined in consideration of all factors associated with the spectral transmittances of the IR cut filter 104 and color filter 105, and the spectral sensitivity characteristic of this solid-state image sensing element.

An A/D conversion unit 107 A/D-converts the image signal output from the image sensor 106 which scans the pixel signal output from each solid-state image sensing element, thereby converting an analog image signal into a digital signal. The digital image signal represents a mosaic color image.

The mosaic color image obtained by conversion into a digital signal by the A/D conversion unit 107 is stored in a storage unit 108 as data. The storage unit 108 also stores demosaiced images data (details of the demosaicing process are described below).

The demosaicing unit 110 reads out the mosaic color image stored in the storage unit 108, and performs a demosaicing process (to be described later) for the readout color image, thereby generating a demosaiced image. The demosaicing unit 110 stores data of this demosaiced image in the storage unit 108.

The reproduction unit 109 reads out the data of the demosaiced image stored in the storage unit 108, and performs various image processes such as spectral image reproduction, edge enhancement, and noise reduction processes for the readout data of the demosaiced image, thereby generating reproduction image data.

The control circuit 111 controls not only the operations of the above-mentioned units but also those of other units which are not shown in the above description. A plurality of control circuits 111 may be provided so that each control circuit 111 individually controls the operation of the corresponding unit of the image sensing apparatus, as a matter of course.

The arrangement of solid-state image sensing elements (pixels) on the image sensor 106 including the color filters 105 arranged on it will be described herein with reference to FIG. 3. Each color filter 105 transmits light having a specific color for the corresponding pixel on the image sensor 106. Hence, referring to FIG. 3, a color filter for transmitting light having, for example, DG (Dark Green) color, and a solid-state image sensing element for receiving the light transmitted through this color filter are arranged in a portion indicated by "DG". In the following description, a color filter for transmitting light having DG color, and a solid-state image sensing element for receiving the light transmitted through this color filter will sometimes be collectively referred to as a "solid-state image sensing element DG". The same applies to LG, G, B, O, and R.

Figure 3:
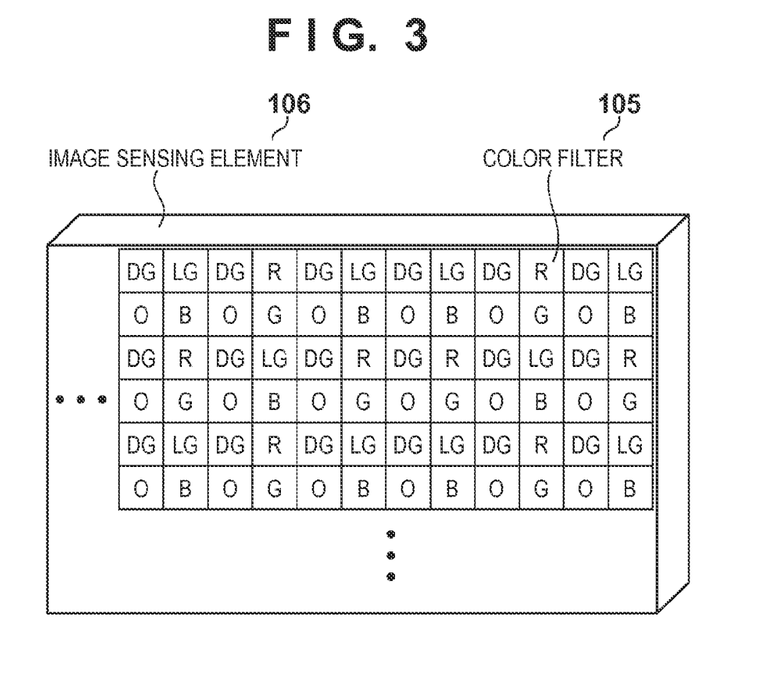
FIG. 3 is a view illustrating an example of the arrangement of solid-state image sensing elements.

The number ratio among solid-state image sensing elements B, DG, G, LG, O, and R on the image sensor 106 (color filters 105) is B:DG:G:LG:O:R=1:2:1:1:2:1, as shown in FIG. 3. As can be seen from this number ratio, the solid-state image sensing elements DG and O are larger in number than the remaining solid-state image sensing elements, and are therefore arranged at a higher density. In the following description, pixels sensed by the solid-state image sensing elements DG and O will be referred to as high-resolution pixels (high-resolution color filters), and those sensed by the solid-state image sensing elements other than the solid-state image sensing elements DG and O will be referred to as low-resolution pixels (low-resolution color filters).

As the arrangement rule of the respective types of solid-state image sensing elements, the solid-state image sensing elements DG and O are arranged on the image sensor 106 in the Bayer arrangement (alternate pattern). Also, solid-state image sensing elements which receive light beams having colors with adjacent peak wavelengths for their spectral transmittances are arranged on the solid-state image sensing elements DG and O in the Bayer arrangement. The image sensing apparatus according to this embodiment mounts the image sensor 106 having such a configuration.

In this embodiment, the peak wavelengths for the spectral transmittances of the color filters of the solid-state image sensing elements DG and O are set so that the focus error amount due to the axial chromatic aberration characteristics of the imaging lens is equal to or smaller than a predetermined amount. When a solid-state image sensing element which senses light having an nth ($1 \leq n \leq N$; $N \geq 5$) color is defined as solid-state image sensing element n, this embodiment can be generalized as follows. That is, among solid-state image sensing elements 1 to N, solid-state image sensing elements p and q arranged on the image sensor 106 at a higher density are formed so that the focus error amount due to the axial chromatic aberration of the imaging lens of the image sensing apparatus between them is equal to or smaller than an amount corresponding to the depth of focus with the maximum aperture.

That is, the image sensor 106 (color filters 105) according to this embodiment exemplifies the following configuration. That is, in an image sensor formed by two-dimensionally arranging solid-state image sensing elements 1 to N in accordance with the Bayer arrangement, the solid-state image sensing elements p and q are formed so that the focus error amount due to the axial chromatic aberration of the imaging lens between them is equal to or smaller than an amount corresponding to the depth of focus with the maximum aperture.

Figure 2:
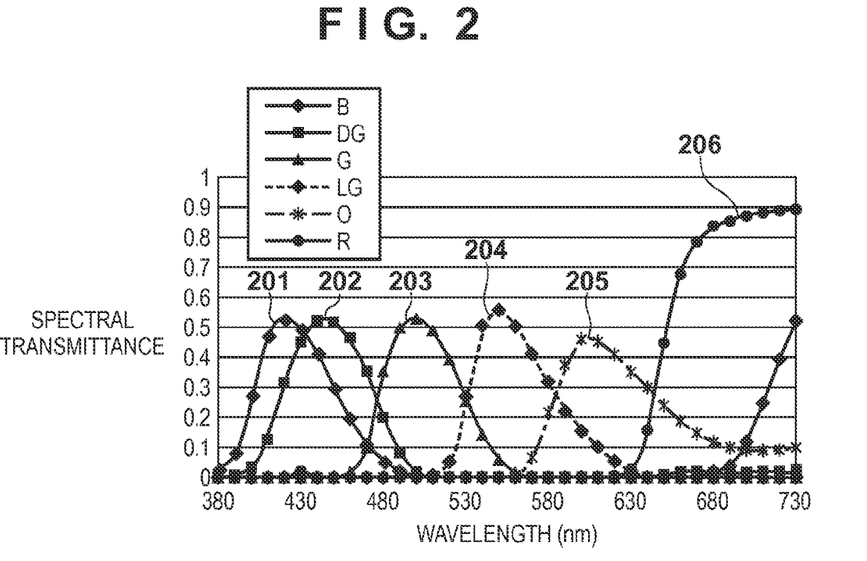
FIG. 2 is a graph showing the spectral transmittances of the color filters 105.

The amount of axial chromatic aberration of the imaging lens, and a focus error in the multiband camera will be described herein with reference to FIGS. 4 and 5. Demosaicing corresponding to color filters having the spectral transmittances and the arrangement on the image sensor, which have been described with reference to FIGS. 2 and 3, is performed mainly using high-resolution color filters, as will be described later. Therefore, each band provided with a high resolution needs to obtain a sharp image. In other words, each band provided with high-resolution color filters needs to have a relatively small focus error amount. At this time, the axial chromatic aberration characteristics of the imaging lens, and the peak wavelengths for the spectral transmittances of the high-resolution color filters must have a specific relationship.

Figure 4:
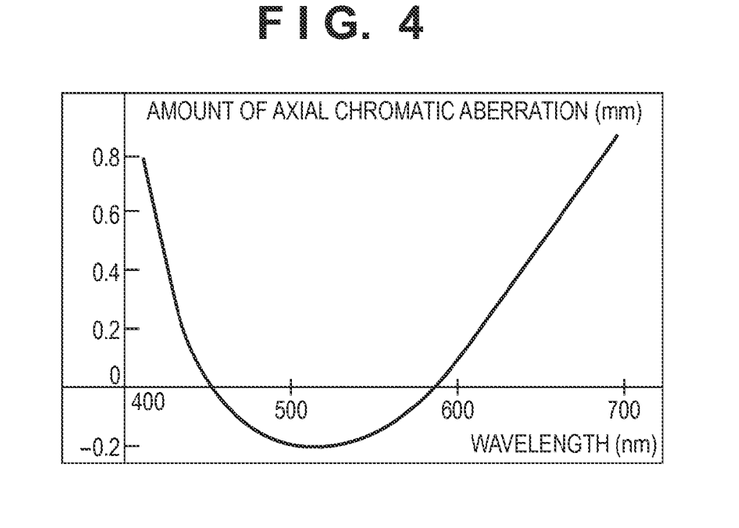
FIG. 4 is a graph showing the axial chromatic aberration characteristics of a typical telephoto lens.

FIG. 4 is a graph showing the axial chromatic aberration characteristics of a typical telephoto lens (Maximum Aperture: 1:4.5; f=500). As shown in FIG. 4, the reference focus position is defined as the wavelength of D line (589.594 nm), and the focus error is positive on the long-wavelength side with respect to the D line, is negative from the D line to a short wavelength of about 450 nm, and is positive again on the short-wavelength side with respect to the short wavelength of about 450 nm. Due to such characteristics, it is of prime importance to select a wavelength at which the focus error amount is zero relative to the focus position on the D line in the lens design. Accordingly, a wavelength of between 400 nm to 500 nm has been selected for a camera having given sensitivities to three, R, G, and B color bands.

Figure 5:
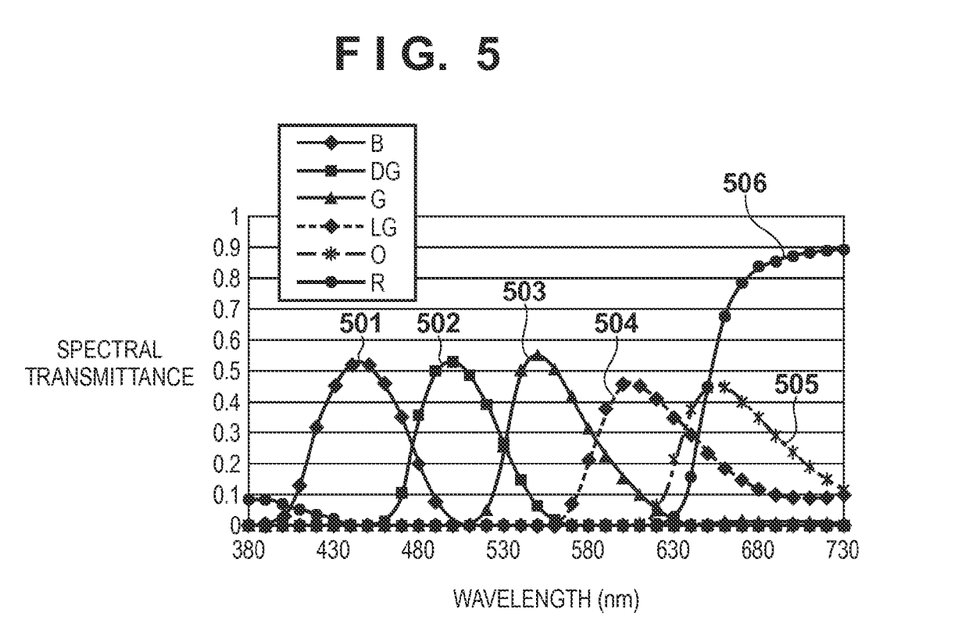
FIG. 5 is a graph illustrating an example of the spectral transmittances of color filters of a general multiband camera.

FIG. 5 illustrates an example of the spectral transmittances of color filters of a general multiband camera to which the image sensor 106 (color filters 105) according to this embodiment is not applied. At this time, the peak wavelength for the spectral transmittance of the color filter of each solid-state image sensing element DG is 500 nm, and that for the spectral transmittance of the color filter of each solid-state image sensing element O is 650 nm. When these two wavelengths are fitted into the curve shown in FIG. 4, the focus error amount between the two bands is about 0.7 mm. As the imaging lens of this camera is compatible with the 135 format, when a permissible circle of confusion diameter of 0.035 mm for the 135 format is used, an aperture of f/10 is required to allow this focus error amount to fall within the range between the two ends of the depth of focus, so this general multiband camera is impractical for a lens having a maximum aperture of f/4.5.

Assume that the image sensor 106 (color filters 105) according to this embodiment is applied, in which the peak wavelength for the spectral transmittance of the color filter of each solid-state image sensing element DG is 450 nm, and that for the spectral transmittance of the color filter of each solid-state image sensing element O is 600 nm. When these two numerical values are fitted into the curve shown in FIG. 4, the focus error amount between the two bands is about 0.1 mm. The f-number required to allow this focus error amount to fall within the range between the two ends of the depth of focus is f/1.4. The imaging lens of this camera has a margin of three stops for the maximum aperture, and therefore has a sufficient utility even in a digital camera whose images are observed as enlarged images.

At this time, a threshold according to which the tolerance of a focus error due to the axial chromatic aberration with respect to the depth of focus provided by the maximum aperture can be determined based on the purpose of the images starting at the no margin with the maximum aperture as the most critical limit.

Figure 6:
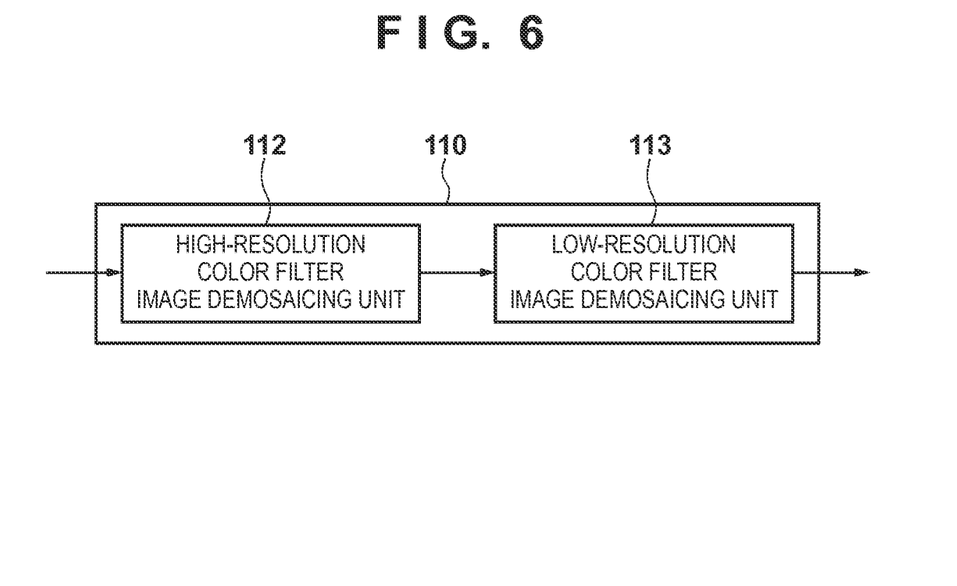
FIG. 6 is a block diagram illustrating an example of the configuration of a demosaicing unit 110.

An example of the configuration of the demosaicing unit 110 will be described next with reference to a block diagram shown in FIG. 6. The operations of a high-resolution color filter image demosaicing unit 112 and low-resolution color filter image demosaicing unit 113 which constitute the demosaicing unit 110 will be described with reference to a flowchart shown in FIG. 7. A mosaic color image sensed by the image sensor 106 is stored in the storage unit 108 when the process according to the flowchart shown in FIG. 7 starts.

First, in step S401, the high-resolution color filter image demosaicing unit 112 calculates the orange (O) and dark green (DG) pixel values for the each pixel which forms the color image. Details of a process operation in step S401 will be described later with reference to a flowchart shown in FIG. 8.

Next, in step S402, the low-resolution color filter image demosaicing unit 113 calculates the pixel values of colors other than orange and dark green for the position of each pixel which forms the color image. Details of a process operation in step S402 will be described later with reference to a flowchart shown in FIG. 11.

<Details of Process Operation in Step S401>

Details of a process operation in step S401 will be described with reference to a flowchart shown in FIG. 8. Process operations in steps S501 to S505 will be described hereinafter with regard to a pixel group within a given region on the image sensor 106, as shown in FIG. 9. However, the same applies to all pixels on the image sensor 106.

Also, the steps S501 to S505 will be described hereinafter with regard to a process of obtaining an orange (O) pixel value $O_{33}$ of a pixel of interest at three pixels to the right and three pixels to the bottom from the upper left corner (a portion indicated as $LG_{33}$) in the pixels group shown in FIG. 9. Note that $LG_{33}$ represents the light green (LG) pixel value of this pixel of interest.

In the step S501, it is determined whether pixels diagonally adjacent to the pixel of interest are high-resolution pixels. If it is determined in the step S501 that the pixels diagonally adjacent to the pixel of interest are high-resolution pixels, the process advances to step S502; otherwise, the process directly advances to step S505. In the case of FIG. 9, pixel values $O_{22}$, $O_{24}$, $O_{42}$, and $O_{44}$ of the pixels diagonally adjacent to the pixel of interest have already been determined, so the pixels diagonally adjacent to the pixel of interest are high-resolution pixels. In the step S502, an average value $O_{33}lpf$ of the pixel values of these four diagonally adjacent high-resolution pixels is calculated by:

$$O_{33}lpf=|O_{22}+O_{24}+O_{42}+O_{44}|/4$$

In step S503, an average value $LG_{33}lpf$ is calculated with the pixel of interest as the center of average. The low-resolution pixel has peak wavelengths neighboring those of the high-resolution pixels. $LG_{33}lpf$ is calculated by:

$$LG_{33}lpf=(4*LG_{33}+LG_{11}+LG_{15}+LG_{51}+LG_{55})/8$$

In step S504, the orange pixel value $O_{33}$ is calculated by:

$$O_{33}=O_{33}lpf/LG_{33}lpf*LG_{33}$$

Note that this embodiment assumes that the ratio between the pixel value and the average pixel value of the pixel of interest does not change in the pixels in the neighboring peak wavelengths in a local region. In step S505, it is determined whether the above-mentioned processes have been performed for all pixels. If it is determined in the step S505 that the above-mentioned processes have been performed for all the pixels, the process advances to step S506. However, if it is determined in the step S505 that pixels (pixels to be processed) that have not yet undergone the above-mentioned processes remain, the process returns to the step S501, in which the above-mentioned processes are performed for the pixels to be processed.

Figure 10:
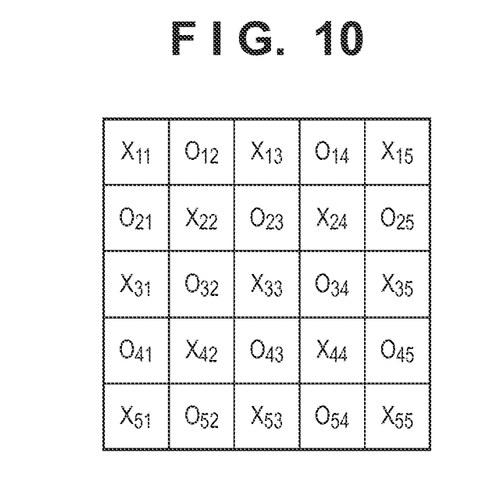
FIG. 10 is a view showing another pixels group.

Process operations in steps S506 to S509 will be described hereinafter with regard to a pixel group within a given region on the image sensor 106, as shown in FIG. 10. However, the same applies to all pixels on the image sensor 106.

Also, steps S506 to S509 will be described hereinafter with regard to a process of obtaining an orange pixel value $O_{33}$ of a pixel of interest, which is assumed to be a pixel (indicated as $X_{33}$) at a position three pixels to the right and three pixels to the bottom from the upper left corner in the pixels group shown in FIG. 10. A portion indicated by "X" in FIG. 10 represents a pixel without an orange pixel value. On the other hand, a portion indicated by "O" represents a pixel with an orange pixel value which has already been determined. Hence, the process for determining an orange pixel value $O_{33}$ of the pixel of interest after the steps S501 to S505 will be described below.

In the step S506, it is determined whether the orange pixel value of the pixel of interest has been determined. If it is determined in the step S506 that this pixel value has been determined, the process directly advances to the step S509; otherwise, the process advances to the step S507.

In the step S507, a difference HDiff33 between the pixel values of two pixels horizontally adjacent to the pixel of interest in the image shown in FIG. 9, and a difference VDiff33 between the pixel values of two pixels vertically adjacent to the pixel of interest in this image are calculated by:

$$HDiff33=|O_{32}-O_{34}|$$

$$VDiff33=|O_{23}-O_{43}|$$

The difference HDiff33 represents a change (horizontal difference) in pixel value between pixels on opposite sides of the pixel of interest in the horizontal direction, and the difference VDiff33 represents a change (vertical difference) in pixel value between pixels on opposite sides of the pixel of interest in the vertical direction. However, as long as information which quantitatively indicates a change in pixel value between pixels on opposite sides of the pixel of interest in the horizontal direction, and a change in pixel value between pixels on opposite sides of the pixel of interest in the vertical direction is used, any information may be used, and this information may be obtained (calculated) using any method.

In step S508, the differences HDiff33 and VDiff33 are compared with each other. If it is determined in step S508 that HDiff33<VDiff33, the change in pixel value is estimated to be more gradual in the horizontal direction than in the vertical direction, so an orange pixel value $O_{33}$ of the pixel of interest is calculated by:

$$O_{33}=(O_{32}+O_{34})/2$$

On the other hand, if it is determined in step S508 that HDiff33 VDiff33, the change in pixel value is estimated to be more gradual in the vertical direction than in the horizontal direction, so an orange pixel value $O_{33}$ of the pixel of interest is calculated by:

$$O_{33}=(O_{23}+O_{43})/2$$

Note that the pixel values of other pixels of interest (other pixels indicated by X in FIG. 10) are similarly calculated using the orange pixel values of four pixels surrounding each of these pixels. In the step S509, it is determined whether the above-mentioned processes have been performed for all the pixels. If it is determined in the step S509 that the above-mentioned processes have been performed for all the pixels, the process of the flowchart shown in FIG. 8 ends, and the process advances to step S402. On the other hand, if pixels that have not yet undergone the above-mentioned processes remain, the process returns to the step S506.

Figure 8:
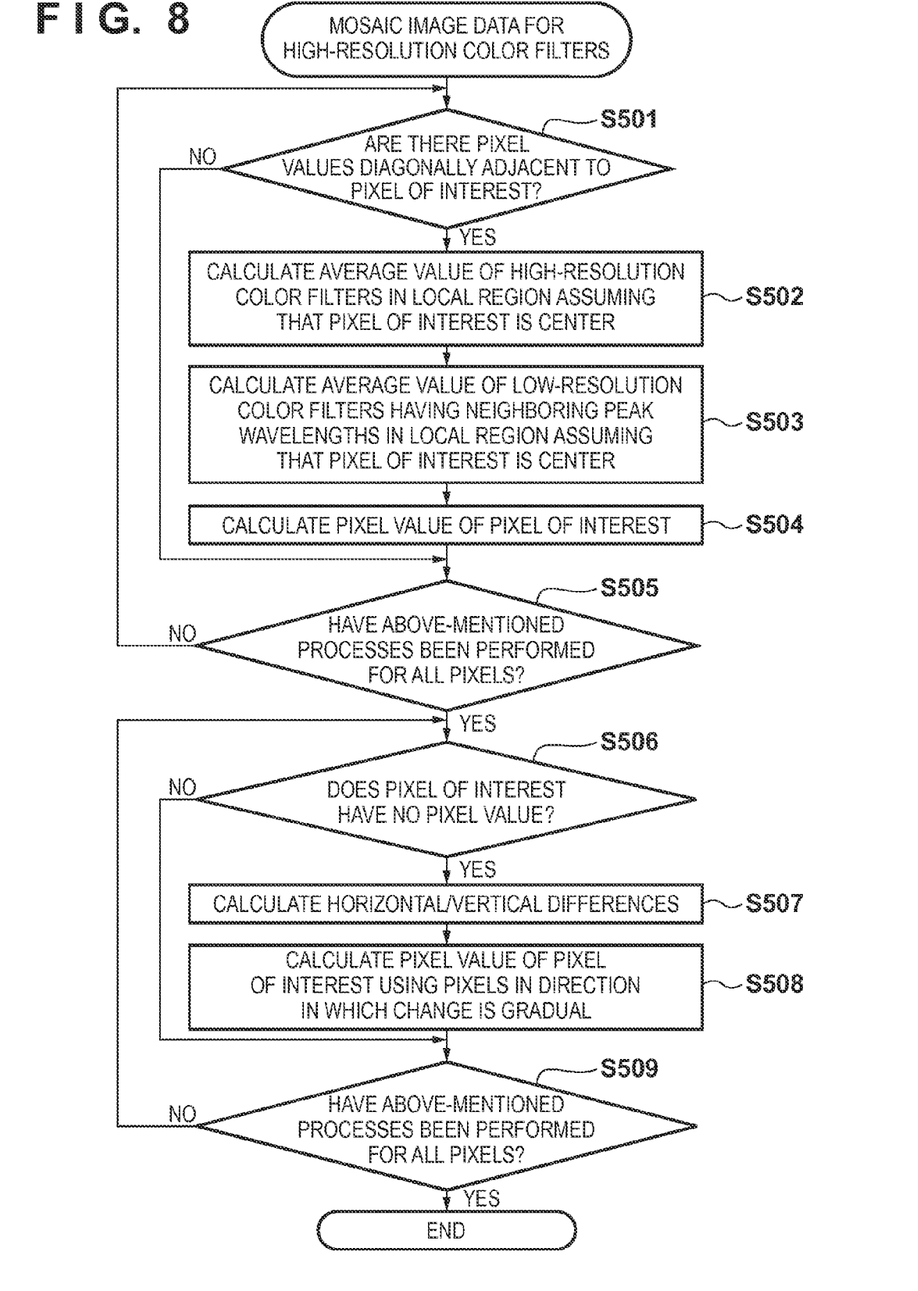
FIG. 8 is a flowchart showing details of a process operation in the step S401.
Figure 9:
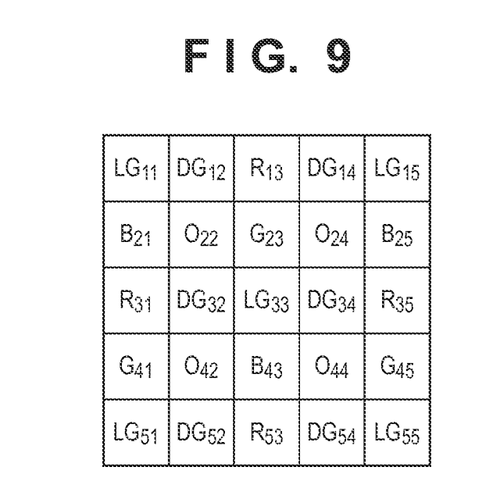
FIG. 9 is a view showing a pixels group.

Note that the orange (O) pixel values of all pixels can be obtained using the process of the flowchart shown in FIG. 8. Hence, the dark green (DG) pixel values of all pixels can be obtained when "the orange pixel value" is replaced with "the dark green pixel value" in the above description. In this way, in step S401, the orange and dark green pixel values are obtained for the position of each pixel which forms the color image.

<Details of Process Operation in Step S402>

Details of a process operation in step S402 will be described with reference to a flowchart shown in FIG. 11. A process operation in the step S402 will be described hereinafter with regard to a pixel group within a given region on the image sensor 106, as shown in FIG. 9. However, the same applies to all pixels on the image sensor 106. Also, the step S402 will be described hereinafter with regard to a process of obtaining a red pixel value $R_{33}$ of a pixel of interest, which is assumed to be a pixel (a portion indicated by $LG_{33}$) at a position three pixels to the right and three pixels to the bottom from the upper left corner in the pixel group shown in FIG. 9.

Figure 12:
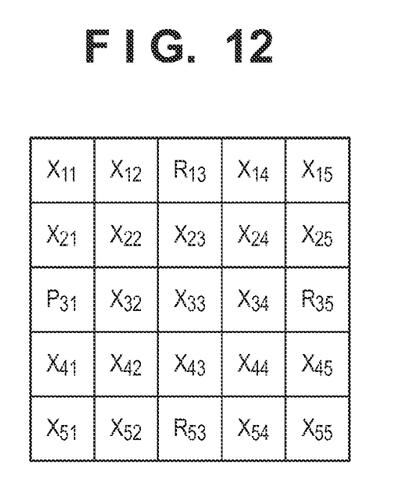
FIG. 12 is a view showing another pixels group.

FIG. 12 shows portions with red pixel values that have been obtained and those with red pixel values that have not been obtained, in the pixels group shown in FIG. 9. Referring to FIG. 12, portions indicated by "X" represent pixels without red pixel values. As can be seen from FIG. 12, the red pixel value of the pixel of interest (indicated as $X_{33}$) has not yet been determined.

In step S801, it is determined whether the red pixel value of the pixel of interest has been determined. If this pixel value has been determined, the process directly advances to step S806; otherwise, the process advances to step S802.

In the step S802, pixels which surround the pixel of interest and have red pixel values that have been determined are searched for. In the case of FIG. 12, pixels in portions indicated by R13, R31, R35, and R53 are searched for.

In step S803, the pixel values of high-resolution pixels having neighboring peak wavelengths are subtracted from the red pixel values of the found pixels to calculate difference pixel values. In the case of FIG. 9, in the step S803, difference pixel values $D_{13}$, $D_{31}$, $D_{35}$, and $D_{53}$ are calculated by:

$$D_{13}=R_{13}-O_{13}$$

$$D_{31}=R_{31}-O_{31}$$

$$D_{35}=R_{35}-O_{35}$$

$$D_{53}=R_{53}-O_{53}$$

In step S804, a difference pixel value $D_{33}$ of the pixel of interest is calculated in accordance with a general interpolation method such as bilinear interpolation using the difference pixel values calculated in step the S803. In step S805, a red pixel value $R_{33}$ is calculated by:

$$R_{33}=D_{33}+O_{33}$$

The use of such a calculation method makes it possible to obtain the red pixel values of pixels in nine portions $X_{22}$, $X_{23}$, $X_{24}$, $X_{32}$, $X_{33}$, $X_{34}$, $X_{42}$, $X_{43}$, and $X_{44}$. The pixel values of other pixels can similarly be calculated by selecting four different pixels as low-resolution pixels surrounding the pixel of interest.

In the step S806, it is determined whether the above-mentioned processes have been performed for all the pixels. If it is determined in the step S806 that the above-mentioned processes have been performed for all pixels, the processes of the flowcharts shown in FIGS. 11 and 7 end. On the other hand, if pixels (pixels to be processed) that have not yet undergone the above-mentioned processes remain, the process returns to the step S801.

Figure 11:
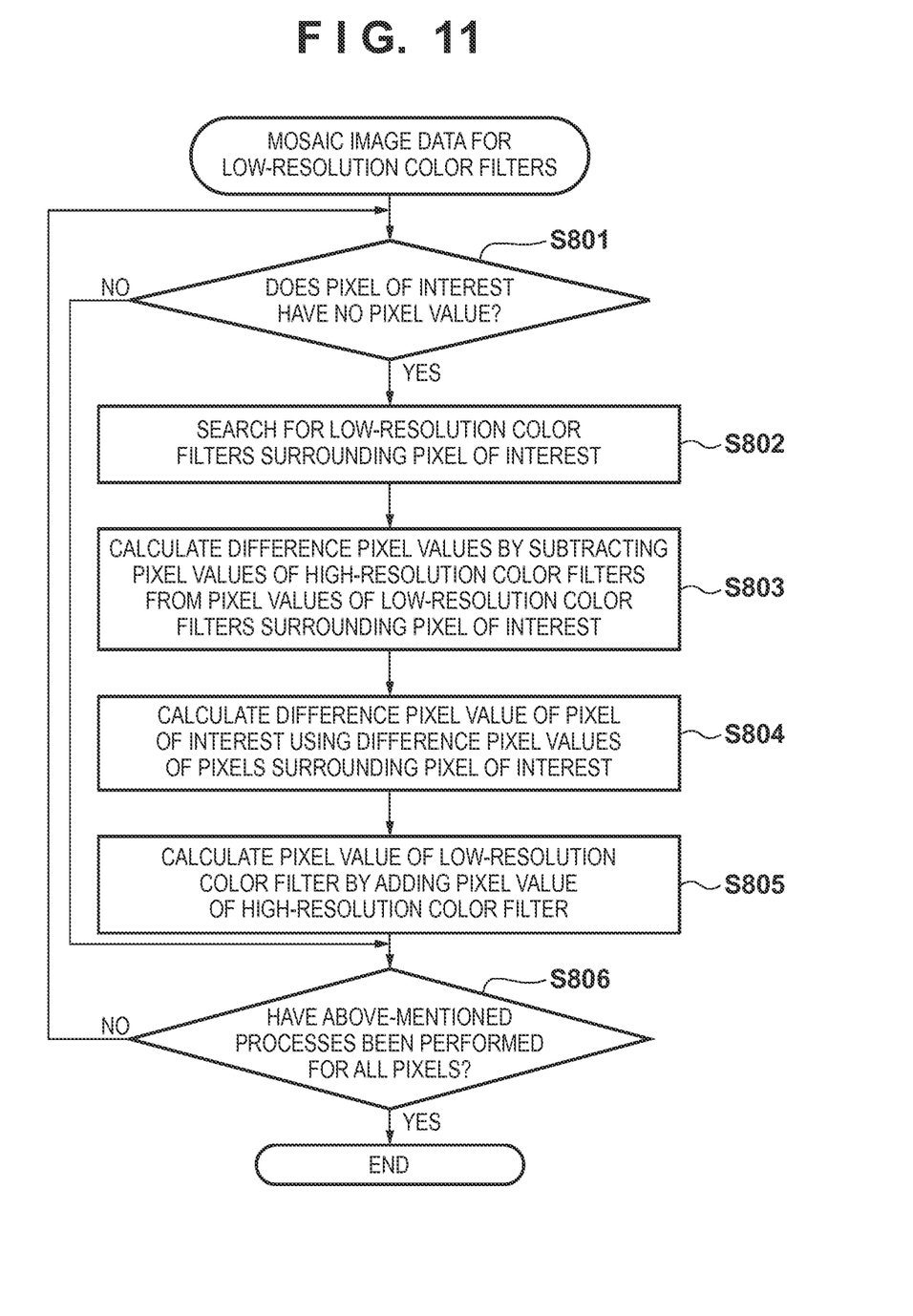
FIG. 11 is a flowchart showing details of a process operation in the step S402.

Note that the red pixel values of all pixels can be obtained using the process of the flowchart shown in FIG. 11. However, the blue pixel values of all pixels can be obtained when "the red pixel value" is replaced with "the blue (B) pixel value" in the above description. The same holds true when "the red pixel value" is replaced with "the green (G) pixel value" or "the light green (LG) pixel value".

Second Embodiment

Figure 13:
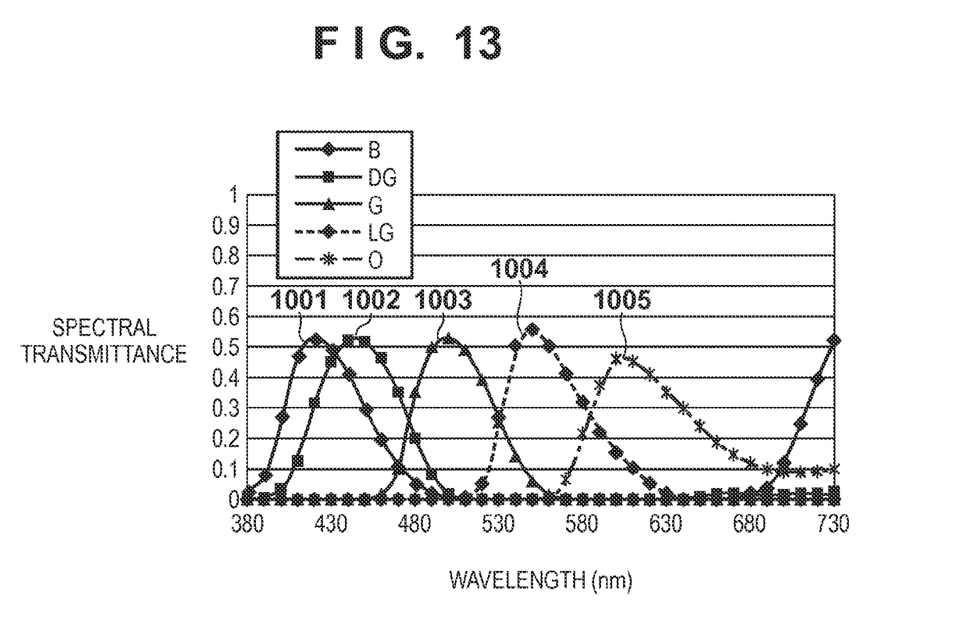
FIG. 13 is a graph showing the spectral transmittances of the color filters 105.

The color filters 105 have six color bands in the first embodiment, whereas it has five color bands in the second embodiment. The spectral transmittances of color filters 105 according to the second embodiment will be described with reference to FIG. 13. The color filters 105 have spectral transmittances 1001 (blue B), 1002 (dark green DG), 1003 (green G), 1004 (light green LG), and 1005 (orange O) in ascending order of peak wavelength.

Figure 14:
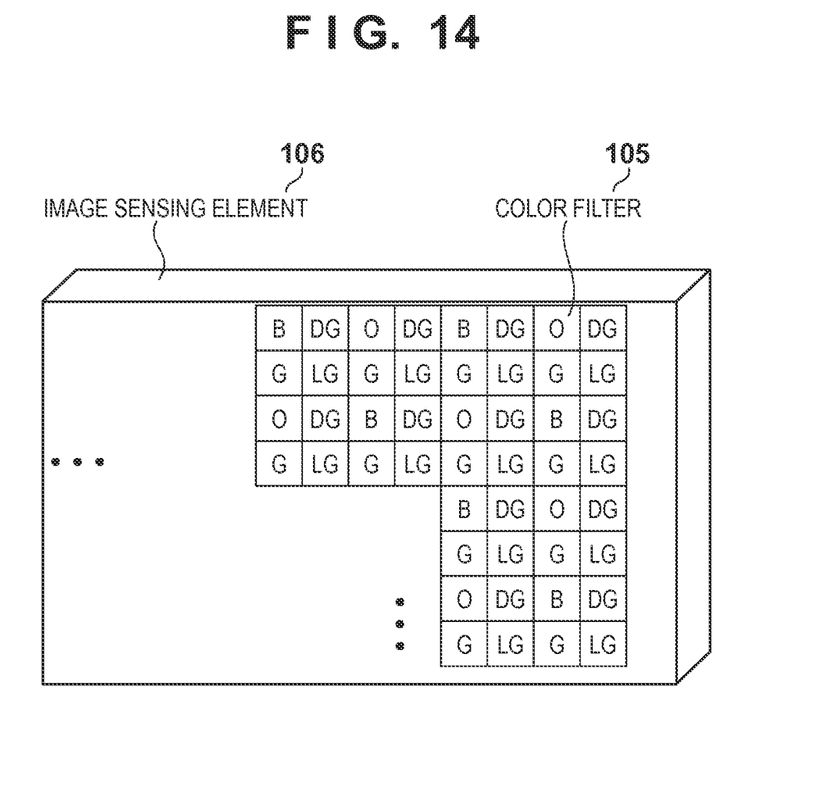
FIG. 14 is a view illustrating another example of the arrangement of solid-state image sensing elements.

In this case, the number ratio among solid-state image sensing elements B, DG, G, LG, and O on an image sensor 106 is B:DG:G:LG:O=1:2:2:2:1, as shown in FIG. 14. As can be seen from this number ratio, the solid-state image sensing elements DG, G, and LG are larger in number than the remaining solid-state image sensing elements, and are therefore arranged at a higher density. Hence, pixels sensed by the solid-state image sensing elements DG, G, and LG are high-resolution pixels, and those sensed by the solid-state image sensing elements B and O are low-resolution pixels.

Figure 7:
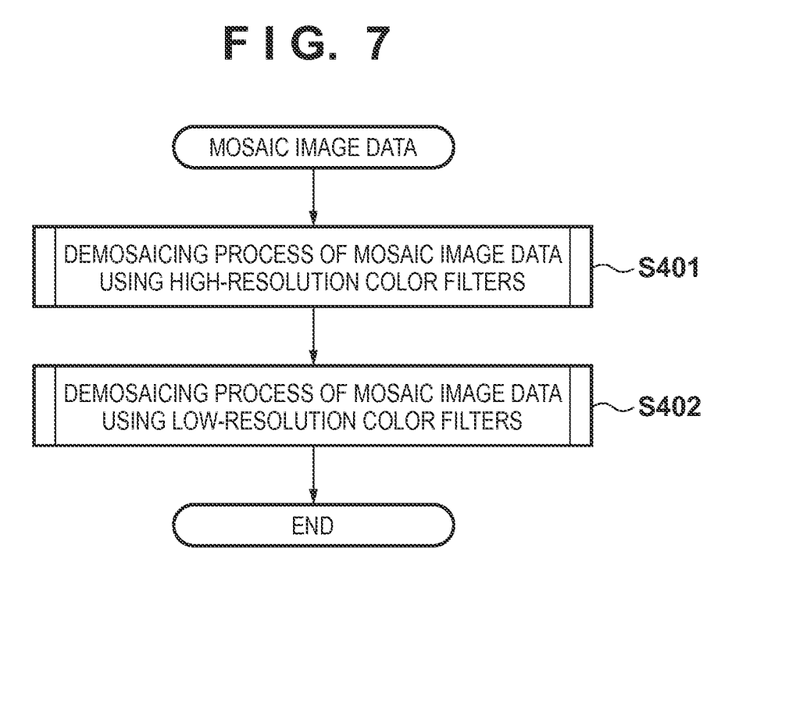
FIG. 7 is a flowchart of a process by the demosaicing unit 110.

The arrangement rule of the respective types of solid-state image sensing elements is the same as in the first embodiment. That is, the process according to the flowchart shown in FIG. 7 is applicable as long as the color filters 105 have five or more color bands.

The peak wavelength for the spectral transmittance of the color filter of each solid-state image sensing element DG is 450 nm, and that for the spectral transmittance of the color filter of each solid-state image sensing element LG is 550 nm. When these two numerical values are fitted into the curve shown in FIG. 4, the focus error amount between the two bands is about 0.15 mm. The f-number required to allow this focus error amount to fall within the range between the two ends of the depth of focus is more than f/2, so this focus error amount has a margin with respect to a lens having a maximum aperture of F4.5.

Third Embodiment

In the above-mentioned embodiments, color filter design is adapted to the axial chromatic aberration characteristics of an imaging lens designed for an RGB camera. In contrast to this, a reference wavelength (a wavelength at which the focus error amount is zero relative to a D line) in terms of correcting axial chromatic aberration may be adjusted for color filter design. In this case, color filter design can be optimized for color reproduction.

That is, an imaging lens may be designed so that the focus error amount due to the axial chromatic aberration of the imaging lens is set equal to or smaller than an amount corresponding to the depth of focus in a maximum aperture with respect to the peak wavelengths for the spectral transmittances of the color filters of the above-mentioned solid-state image sensing elements p and q.

Fourth Embodiment

The demosaicing algorithm used in the first and second embodiments employs averaging using the local average values of low-resolution filter images and the direction in which the pixel value changes, upon demosaicing of high-resolution filter images. However, instead of using this method, a demosaicing process can also be performed by averaging the values of demosaiced images of high-resolution filter images. In this case, the process is simplified and requires only a short period of time. That is, the demosaicing algorithm is not limited to one method.

Fifth Embodiment

Each of the processes described in the first and second embodiments is assumed to be performed in the image sensing apparatus. However, these processes may be performed in a PC (Personal Computer). In this case, a computer program for causing the PC to execute each of the processes described with reference to the above-mentioned flowcharts must be installed on a memory of the PC. The PC can execute each of the processes described with reference to the above-mentioned flowcharts by reading out the computer program from the memory and executing it. The information stored in a storage unit 108, as described above, must also be stored in the PC, as a matter of course.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-026527 filed Feb. 9, 2011, which is hereby incorporated by reference herein in its entirety.

What is claimed is:

1. An image sensing apparatus mounting an imaging lens and an image sensor formed by two-dimensionally arranging solid-state image sensing elements including N types (N being a number greater than or equal to 5) of solid-state image sensing elements in accordance with a Bayer arrangement, and where the respective types of the solid-state image sensing elements sense lights of colors different from each other, wherein peak wavelengths for spectral transmittances of color filters of a first type of solid-state image sensing elements and a second type of solid-state image sensing elements are set so that a focus error amount due to an axial chromatic aberration of said imaging lens of the image sensing apparatus being defined on the basis of the peak wavelengths is not more than a predetermined amount, the number of the first type solid-state image sensing elements and the number of the second type solid-state image sensing elements are largest among the N types of solid-state image sensing elements, and said imaging lens has an f-number which allows the focus error amount to fall within a range between two ends of the depth of focus.

2. The apparatus according to claim 1, wherein the focus error amount due to the axial chromatic aberration of said imaging lens of the image sensing apparatus is a difference between an axial chromatic aberration corresponding to a peak wavelength of the first type solid-state image sensing element and an axial chromatic aberration corresponding to a peak wavelength of the second type solid-state image sensing element.

3. The apparatus according to claim 1, wherein the predetermined amount is defined according to an amount corresponding to a depth of focus in a maximum aperture.

* * * * *